(No Model.)
A. D. GOODELL.
DRILL CHUCK.
No. 374,594. Patented Dec. 13, 1887.
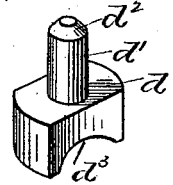
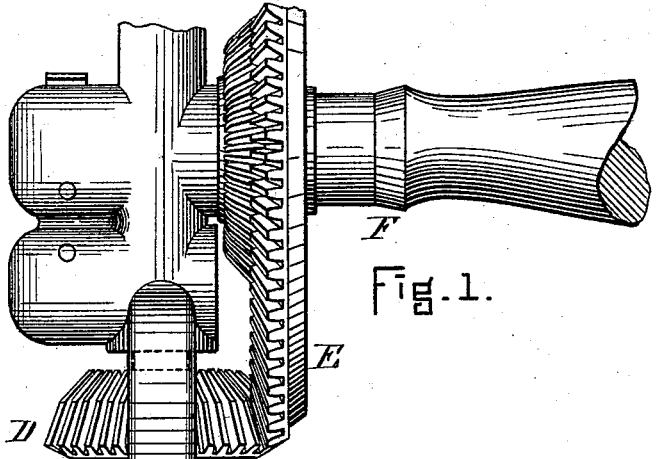
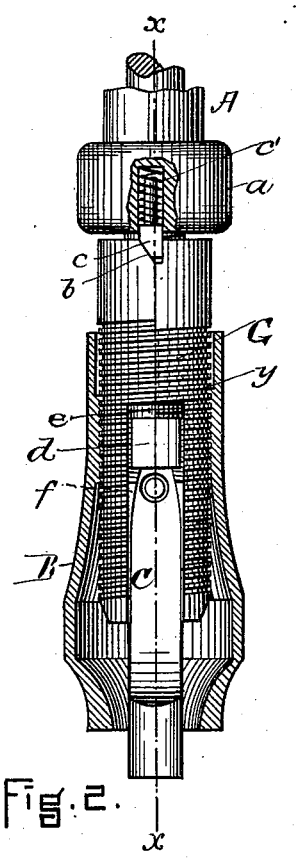
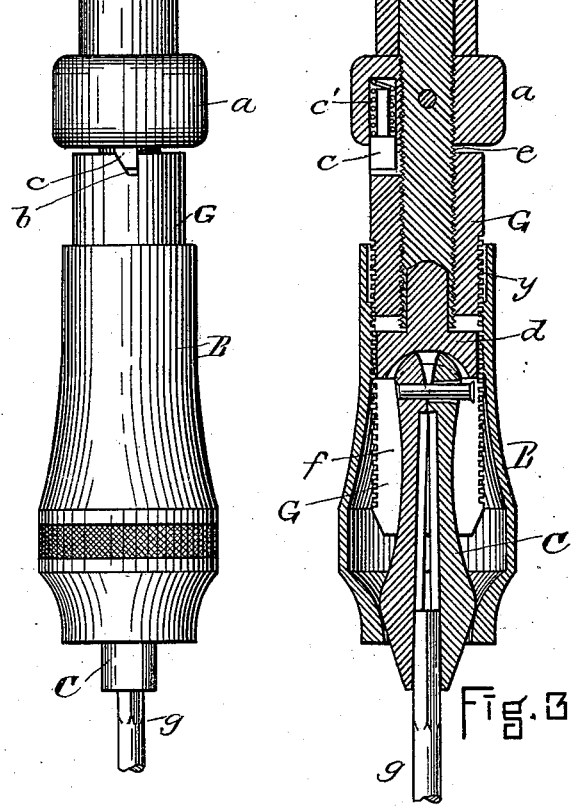
WITNESSES
Helen C. Parker.
A. C. Thompson
INVENTOR.
Albert D. Goodell
by Bourlain S. Parker
his atty.

UNITED STATES PATENT OFFICE.

ALBERT D. GOODELL, OF MILLER'S FALLS, MASSACHUSETTS, ASSIGNOR TO THE MILLER'S FALLS COMPANY, OF SAME PLACE.

DRILL-CHUCK.

SPECIFICATION forming part of Letters Patent No. 374,594, dated December 13, 1887.

Application filed June 30, 1887. Serial No. 242,963. (No model.)

*To all whom it may concern:*

Be it known that I, ALBERT D. GOODELL, of Miller's Falls, in the county of Franklin and State of Massachusetts, have invented certain new and useful Improvements in Drill-Chucks, of which the following, taken in connection with the accompanying drawings, is a specification.

My present invention consists in an improvement in drill-chucks, by means of which I am enabled to hold securely in said chuck drills and other articles having round shanks.

The chucks heretofore used have been more specially adapted to holding drills with square shanks, or so formed as to be firmly seated in the jaws; but they have not been able to firmly hold round-shank drills and tools so that they would not turn while being operated. I overcome this difficulty by a novel construction, which enables me to obtain far greater gripping power upon the jaws than it has been possible to heretofore obtain.

In the drawings like letters of reference indicate corresponding parts.

Figure 1 is a view in elevation. Fig. 2 is a view partly in section and partly in elevation. Fig. 3 is a sectional view on line $x\ x$, Fig. 2. Fig. 4 is a perspective view of the adjustable seat for the jaws.

A is the spindle of the drill-chuck.

E D are gears by which the chuck proper is rotated.

B is the shell or sleeve, which passes over the end and presses together the jaws C upon the shank of any article placed therein, as represented by $g$. The exterior part of the socket G is threaded, as indicated by $y$. The shell B is threaded internally at its lower end and screwed down upon the socket G in the usual manner.

Fig. 4 is an adjustable seat, which is placed in the slot of the socket G, and into which the jaws C are placed. The end of the spindle A passes up through the socket G, and is held thereon by a very fine screw-thread, (represented by $e'$.) Upon the top of this screw-threaded spindle rests the adjustable seat $d$.

The general style of the chuck is similar to those now in use, having a slotted socket to receive the jaws, and also threaded externally to receive the shell, which is screwed down over the jaws to close them; but instead of placing the lower end of the jaws into a solid seat in the socket, I insert an adjustable seat, (represented by $d$,) which is operated by means of a threaded spindle, upon which the main socket G is screwed by a corresponding thread. This spindle is provided with a very fine thread, $e'$, so as to give all the power possible. It has also a round socket to receive the small hardened center $d'\ d^2$, with which the adjustable socket $d$ is provided and in which it turns, thus relieving it of nearly all of the friction in the process of tightening the jaws of the chuck upon the shank of articles placed therein. When the socket and shell are screwed down into the spindle, the seat $e$ is moved upward, carrying with it the jaws C, which are placed in the cavity $d^3$ of the seat $e$, and forcing them into the tapering part of the shell and causing the extra pressure desired.

In operating this chuck the shank of the tool is placed between the jaws, and the shell is screwed down over the jaws upon the socket, thus closing the jaws. Now, by continuing the turning in the same direction the socket will turn upon the fine threaded spindle, which in turn acts upon the seat $d$, carrying it and the jaws inserted in the slot forward and outward into the tapering part of the shell bearing upon them. The additional force thus exerted upon the jaws, which hold the shank of the article placed therein, is immensely increased.

In order to prevent the socket G from turning on the spindle A when the shell B is turned down to close the jaws, it is necessary to provide some means for securing it. This may be done in a variety of ways; but I prefer to do it by placing in the collar $a$ a friction-catch, $c$, which engages in a notch in the socket, thus holding it until the shell has been turned down on the socket and closed the jaws. Underneath the socket is placed the collar $a$, which is made fast to the spindle A. The collar may be made integral with the spindle, if preferred. This collar has formed in it a suitable socket to receive the friction-catch $c$, which is supported by a spiral spring, $c'$, to force it into the notch $b$ in the socket. The notch $b$ is made to correspond in shape with the top of the catch, and which, as indicated, has on the back side a straight surface to prevent the socket from turning too far back on the spindle when the chuck is turned backward, and on the front side an inclined or beveled surface, so that the socket may turn forward by pressing down the catch itself when the necessary amount of force is applied.

By the device I have invented and herein described I am enabled to hold more firmly any article placed in the jaws of the chuck than has heretofore been possible, for the special reason that I am enabled to compress the jaws together with much greater force than is possible in the ordinary form of drill-chucks or similar chucks.

Having now described my invention, what I claim, and desire to secure by Letters Patent of the United States, is—

1. The combination of the shell B, jaws C, adjustable seat $d$, screw-spindle A, socket G, friction-catch $c$, and collar $a$, arranged and adapted substantially as and for the purpose set forth.

2. In a drill or similar chuck, an adjustable seat adapted to hold the jaws and to project them outwardly against the shell by suitable means from beneath, substantially as and for the purposes set forth.

3. In a chuck, the combination of the threaded spindle A, adjustable seat $d$, and socket G, adapted to force the jaws outwardly against the shell of the chuck, substantially as and for the purposes set forth.

4. In a chuck, the collar $a$, catch $c$, spring $c'$, and notch $b$, arranged and adapted to operate in combination with a double-threaded chuck, substantially as and for the purposes set forth.

5. In a chuck, the combination of the screw-threaded parts $y$ and $e'$, adapted to force outwardly and compress the jaws against the interior of the shell, substantially as and for the purposes described.

6. In an organized chuck, the threaded spindle A, supporting the seat $d$, and adapted, in combination with the threaded socket G and shell B, to multiply the compression of the jaws, substantially as and for the purposes described.

In testimony whereof I have signed my name to this specification, in the presence of two subscribing witnesses, on this 23d day of June, A. D. 1887.

ALBERT D. GOODELL.

Witnesses:
E. S. ELLIOT,
T. J. GUNN.

Corrections in Letters Patent No. 374,594.

It is hereby certified that in Letters Patent No. 374,594, granted December 13, 1887, upon the application of Albert D. Goodell, of Miller's Falls, Massachusetts, for an improvement in "Drill-Chucks," errors appear in the printed specification requiring the following corrections, viz: On page 1, in lines 46 and 58, the reference letter "e'" should read e; in lines 67 and 69, the reference letter "e" should read d, and on page 2, in line 38, reference letter "e'" should read e; and that the said Letters Patent should be read with these corrections therein that the same may conform to the record of the case in the Patent Office.

Signed, countersigned, and sealed this 27th day of December, A. D. 1887.

[SEAL.]

H. L. MULDROW,
*Acting Secretary of the Interior*

Countersigned:
    BENTON J. HALL,
        *Commissioner of Patents.*